Patented Mar. 4, 1947

2,417,024

UNITED STATES PATENT OFFICE 2,417,024

MANUFACTURE OF ACROLEIN OXIME AND ACRYLONITRILE

Karl Heinrich Walter Tuerck, Banstead, and Hans Joachim Lichtenstein, London, England, assignors to The Distillers Company Limited, Edinburgh, Scotland, a British company No Drawing. Application January 11, 1944, Serial No. 517,866. In Great Britain November 13, 1942

21 Claims. (Cl. 260—464)

This invention relates to the manufacture of oximes. Its object is the preparation of acrolein oxime and, incidentally its conversion to acrylonitrile.

Acrolein oxime has hitherto been unknown, and in view of the great tendency of acrolein to polymerise or to add various groups at the double bond, it was not certain whether its oxime could be produced in a form which would react to give the corresponding acrylo-nitrile on dehydration. It was furthermore to be expected that the acrolein oxime would not be stable, since formaldehyde, which is also the first member of an homologous series, on reaction with hydroxylamine, forms an oxime which polymerises immediately to a polymeric oxime. Crotonaldehyde, which is the next higher homologue, is considerably less reactive than acrolein and yet its oxime can only be obtained under carefully chosen and limited conditions (Monatshefte für Chemie, vol. 12, page 410) with a yield of less than 17%.

When attempts are made to react acrolein with a solution of hydroxylamine hydrochloride to which sodium carbonate had been added until the solution reacted neutral to methyl orange or even litmus, as was suggested in the case of crotonaldehyde in the above-mentioned publication, the reaction does not yield the desired acrolein oxime at all.

We have found that the free acid which results from the dissociation of hydroxylamine hydrochloride or hydroxylamine sulphate, or which, even in previously neutralised solutions, is set free from these salts by the formation of the oxime does not inhibit the reaction between hydroxylamine and acrolein, but influences the reaction so as to lead to the formation of a highly viscous product which cannot easily be separated from the solution, and which is clearly not the desired monomeric oxime.

According to our invention there is provided a process for the manufacture of acrolein oxime which comprises reacting acrolein with a solution of hydroxylamine in the substantial absence of free, strong inorganic acids at a temperature not exceeding 50° C. and at a pH of not less than 6.5 whereby the hitherto undescribed acrolein oxime is obtained in the monomeric form. We may, for example, use solutions of free hydroxylamine, or solutions of hydroxylamine hydrochloride, -sulphate, -acid sulphate or -nitrate, to which at least the equivalent amount of a neutralising agent, capable of neutralising free strong inorganic acids, such as sodium acetate, sodium carbonate or calcium carbonate has been added, or to which such neutralising agents are gradually added as the reaction proceeds in such a manner as to ensure the substantially complete absence of the said free inorganic acids. It is also possible to use hydroxylamine in the form of its salts with weak acids, e. g. hydroxylamine acetate.

The reaction is preferably carried out in an aqueous medium. The temperature should not exceed 50° C. and is preferably maintained below 25° C.

If an alkali hydroxide or carbonate is used for neutralising the strong acid present, we prefer to avoid any large excess of the neutralising agent and to maintain the pH of the solution below 9. It is even preferable to neutralize the excess of alkali before the oxime is separated from the aqueous solution e. g. by extraction with a solvent. After the reaction is ended, the oxime can be separated off as an oily layer or extracted with an organic solvent.

The pure acrolein oxime is an oily liquid, boiling at 108° C./220 mm. Hg or at 35° C./9 mm. Hg and has at 15° C. a specific gravity of 0.996 compared with water at 15° C. It reacts readily with a dehydrating agent such as acetic anhydride to give acrylo-nitrile in practically quantitative yield.

A very efficient way of carrying out the invention is to react the acrolein with hydroxylamine hydrochloride in the presence of calcium carbonate taking care that the pH of the solution is maintained not lower than 6.5.

It is possible to separate out the oxime by salting it out from the aqueous solution in which it has been produced. High yields are obtained if the concentrations of the reaction components are so chosen that the oxime separates out as an oil during the course of the reaction so that it is no longer subjected to any secondary reaction in the aqueous phase. Thus we prefer to react 1 part of acrolein in not more than 4 parts of water.

After separating off the oily layer of the oxime, the remaining aqueous layer may be further extracted with an organic solvent and/or used as a medium for forming the following batch of acrolein oxime. Accordingly, the whole process may be conducted continuously, while the oil is separated off from time to time or continuously in a separator, through which the reaction medium is made to circulate.

The oxime, in the form in which it separates out from the aqueous solution, or is extracted from it by means of an organic solvent, may be converted to acrylonitrile with excellent yields and the invention therefore includes a process for the manufacture of acrylonitrile which comprises removing the elements of water from acrolein oxime by means of a dehydrating agent. This may be effected for example by the action of acetic anhydride at low or moderate temperatures. A special purification is not necessary, and it is a special feature of this invention to subject the whole of the separated reaction product to the action of the dehydration agent.

We have further found that the oxime obtained according to the process of our invention undergoes a slow transformation on standing to a product which is more soluble in water than the oxime initially produced. This soluble substance has been found to give lower yields of acrylonitrile on dehydration and we therefore prefer to carry out dehydration of the oxime as soon as possible after formation.

The oxime may be added gradually to the acetic anhydride, while by cooling the temperature is kept low, e. g. below 50° C. Inhibitors which prevent the polymerisation of acrylonitrile are suitably added. The acetic anhydride may be diluted, preferably by acrylonitrile or acetic acid.

Yet another method of forming acrylonitrile is to react a dehydrating agent with the oxime in the extracting solvent without previously isolating it. We prefer to use, in this case, a solvent from which the acrylonitrile can be separated by distillation. It is, however, preferable to distil off the nitrile in a column and to wash the vapours, which may contain some acetic acid, with water, or to introduce at the top of the column the amount of water necessary to carry off the nitrile in the form of its azeotrope with water, which boils at 65° C.

In view of the reactivity of the acrylonitrile, it is preferable to distil off the formed nitrile continuously in vacuo.

For dehydration to the nitrile, the oily oxime may also be vapourised e. g. by distillation in vacuo, or by the use of an inert gaseous carrier, and passed over a dehydrating catalyst such as alumina, at temperatures between 200° and 400° C.

The process according to the invention is of special significance in connection with the utilisation of acrolein produced by the condensation of formaldehyde with acetaldehyde in the vapour phase. Thus, the vapours leaving the reaction zone, and which contain, besides acrolein, unreacted formaldehyde and acetaldehyde, are passed into a solution of hydroxylamine under the conditions of our invention. After the acrolein oxime has been separated from the solution as an oily layer or by extraction with an organic solvent, the solution is acidified and heated, so that the formaldehyde and acetaldehyde are liberated and can be recycled back into the condensation process; any remaining hydroxylamine-containing solution may also, of course, be recovered and used.

In carrying out the process of our invention, it is not necessary to utilise pure hydroxylamine salts, as the oxime may readily be formed by the use of crude solutions of hydroxylamine salts such as are obtained for example in the acid hydrolysis of 1-nitropropane. The reaction product from this hydrolysis consists of a hydroxylamine salt together with propionic acid.

The following examples illustrate the manner in which acrolein oxime and acrylonitrile may be prepared and the quantities are referred to as parts by weight.

*Example I.*—To a solution of 105 parts of hydroxylamine hydrochloride in 100 parts of water, 80 parts of sodium carbonate dissolved in 300 parts of water are added while stirring. 56 parts of acrolein are then gradually added while keeping the temperature at 20° C. by external cooling.

The acrolein reacts rapidly and as soon as no free acrolein is left, the solution is extracted with ether.

On evaporation of the solvent from the ether extract, 40 parts of an oily liquid are obtained, which on analysis (nitrogen content and estimation of the oxime group) proves to be practically pure acrolein oxime.

*Example II.*—To an ether extract, obtained according to Example I, 75 parts of acetic anhydride are added. After 2 hours' standing at room temperature the ether is distilled off, the residue diluted with water and the acrylonitrile distilled off as an azeotrope with the water. 27 parts acrylonitrile are obtained.

*Example III.*—47 parts of acrolein are introduced into a solution of 60 parts of hydroxylamine hydrochloride dissolved in 150 parts of water to which 100 parts of calcium carbonate had been added. The temperature is kept below 25° C. by cooling. The solution was maintained uniformly at a pH of about 7 by vigorous agitation.

From the reaction mixture 32 parts of an oil separate out, on extraction a further 20 parts could be isolated. The oil is acrolein oxime, which on immediate treatment with acetic anhydride yields acrylonitrile in almost quantitative yield.

If the experiment described in Example I is carried out as described but instead of using the amount of 80 parts of sodium carbonate, only so much sodium carbonate is added to the hydroxylamine hydrochloride solution as is necessary to make that solution neutral as suggested in the literature reference quoted above for the formation of the oxime of crotonaldehyde then, on extraction with ether after the acrolein had been reacted, only traces of an insoluble oil could be extracted from the solution.

What we claim is:

1. A process for the manufacture or acrolein oxime which comprises reacting acrolein with a solution of hydroxylamine in the substantial absence of free, strong inorganic acids at a temperature not exceeding 50° C. and at a pH of 6.5 to 9 and isolating from the reaction mixture monomeric acroleinoxime having the formula $CH_2=CH-CH=NOH$ and a boiling point of about 35° C. under a pressure of 9 mm. of mercury and a specific gravity of about 0.996 at 15° C.

2. A process for the manufacture of acrolein oxime which comprises reacting acrolein with an aqueous solution of a hydroxylamine salt of a strong inorganic acid containing an amount of a neutralizing agent sufficient to maintain the pH of the solution between 6.5 and 9 and isolating from the reaction mixture monomeric acroleinoxime having the formula $CH_2=CH-CH=NOH$ and a boiling point of about 35° C. under a pressure of 9 mm. of mercury and a specific gravity of about 0.996 at 15° C.

3. A process for the manufacture of acrolein oxime which comprises reacting acrolein with an aqueous solution of a hydroxylamine salt of a strong inorganic acid containing an amount of an alkali metal salt of an organic acid sufficient to maintain the pH of the solution between 6.5 and 9 and isolating from the reaction mixture monomeric acroleinoxime having the formula $CH_2=CH-CH=NOH$ and a boiling point of about 35° C. under a pressure of 9 mm. of mercury and a specific gravity of about 0.996 at 15° C.

4. A process for the manufacture of acrolein oxime which comprises reacting acrolein with an aqueous solution of a hydroxylamine salt of a strong inorganic acid and, during the reaction, gradually adding an amount of a neutralizing agent sufficient to maintain the pH of the solution between 6.5 and 9 and isolating from the reaction mixture monomeric acroleinoxime having the formula $CH_2=CH-CH=NOH$ and a boiling point of about 35° C. under a pressure of 9 mm. of mercury and a specific gravity of about 0.996 at 15° C.

5. A process for the manufacture of acrolein oxime which comprises reacting acrolein with an aqueous solution of a hydroxylamine salt of a strong inorganic acid and, during the reaction, gradually adding an amount of an alkali metal salt of an organic acid sufficient to maintain the pH of the solution between 6.5 and 9 and isolating from the reaction mixture monomeric acroleinoxime having the formula $CH_2=CH-CH=NOH$ and a boiling point of about 35° C. under a pressure of 9 mm. of mercury and a specific gravity of about 0.996 at 15° C.

6. A process for the manufacture of acrolein oxime which comprises reacting acrolein with an aqueous solution of a hydroxylamine salt of a strong inorganic acid containing an amount of calcium carbonate sufficient to maintain the pH of the solution between 6.5 and 9 and isolating from the reaction mixture monomeric acroleinoxime having the formula $CH_2=CH-CH=NOH$ and a boiling point of about 35° C. under a pressure of 9 mm. of mercury and a specific gravity of about 0.996 at 15° C.

7. A process for the manufacture of acrolein oxime which comprises reacting acrolein with a solution of a hydroxylamine salt of an organic acid in the substantial absence of free, strong inorganic acids at a temperature not exceeding 50° C. and at a pH of 6.5 to 9 and isolating from the reaction mixture monomeric acroleinoxime having the formula $CH_2=CH-CH=NOH$ and a boiling point of about 35° C. under a pressure of 9 mm. of mercury and a specific gravity of about 0.996 at 15° C.

8. A process according to claim 2 wherein any excess of said neutralizing agent is neutralized prior to the recovery of the acroleinoxime from the reaction liquor.

9. A process for the manufacture of acrolein oxime which comprises reacting acrolein with a solution of hydroxylamine in the substantial absence of free, strong inorganic acids at a temperature not exceeding 50° C. and at a pH of 6.5 to 9, the concentration of the reactants in the reaction mixture being such that the formed oxime separates out from the reaction mixture as an oil during the course of the reaction and isolating from the reaction mixture monomeric acroleinoxime having the formula $CH_2=CH-CH=NOH$ and a boiling point of about 35° C. under a pressure of 9 mm. of mercury and a specific gravity of about 0.996 at 15° C.

10. A process according to claim 9 wherein for each part by weight of acrolein not more than four parts of weight of water is used.

11. A process according to claim 9 wherein the formed oxime is continually separated from the reaction mixture which latter is recycled with further quantities of acrolein and hydroxylamine.

12. A process according to claim 9 wherein the formed oxime is continually separated from the reaction mixture which latter is recycled with further quantities of acrolein and a hydroxylamine salt of an organic acid.

13. A process according to claim 9 wherein the formed oxime is continually separated from the reaction mixture which latter is recycled with further quantities of acrolein, a hydroxylamine salt of a strong inorganic acid and such an amount of a neutralizing agent as is necessary to maintain the pH of the reaction mixture at a value between 6.5 and 9.

14. A process for the manufacture of acroleinoxime wherein acrolein vapours containing also formaldehyde and acetaldehyde, obtained from the vapour phase condensation of formaldehyde and acetaldehyde for the production of acrolein, are passed into an aqueous hydroxylamine-containing solution maintained at a pH between 6.5 and 9 and, after separation of the monomeric acroleinoxime having the formula $CH_2=CH-CH=NOH$ and a boiling point of about 35° C. under a pressure of 9 mm. of mercury and a specific gravity of about 0.996 at 15° C. from the reaction mixture, said solution is acidified and heated and the evolved formaldehyde and acetaldehyde vapours recovered and recycled to the condensation process.

15. Acroleinoxime having the formula $$CH_2=CH-CH=NOH$$ 

and a boiling point of about 35° C. under a pressure of 9 mm. of mercury and a specific gravity of about 0.996 at 15° C.

16. A process for the manufacture of acrolein oxime which comprises reacting acrolein with a solution of hydroxylamine in the substantial absence of free, strong inorganic acids at a temperature not exceeding 25° C. and at a pH of 6.5 to 9 and isolating from the reaction mixture monomeric acroleinoxime having the formula $CH_2=CH-CH=NOH$ and a boiling point of about 35° C. under a pressure of 9 mm. of mercury and a specific gravity of about 0.996 at 15° C.

17. A process for the manufacture of acrylonitrile which comprises reacting acrolein with a solution of hydroxylamine in the substantial absence of free, strong inorganic acids at a temperature not exceeding 50° C. and at a pH of 6.5 to 9, isolating from the reaction mixture monomeric acroleinoxime having the formula $CH_2=CH-CH=NOH$ and a boiling point of about 35° C. under a pressure of 9 mms. of mercury and a specific gravity of about 0.996 at 15° C., and vapourising said monomeric acroleinoxime and passing the vapours over a dehydrating catalyst comprising alumina at a temperature of 200° to 400° C. whereby acrylonitrile is produced.

18. A process according to claim 17 wherein said vapours are obtained by distillation in vacuo.

19. A process according to claim 17 wherein said vapours are produced by the use of an inert gaseous carrier.

20. A process for the manufacture of acrylonitrile which comprises reacting acrolein with a solution of hydroxylamine in the substantial absence of free, strong inorganic acids at a temperature not exceeding 50° C. and at a pH of 6.5 to 9, isolating from the reaction mixture monomeric acroleinoxime having the formula $CH_2=CH-CH=NOH$ and a boiling point of about 35° C. under a pressure of 9 mms. of mercury and a specific gravity of about 0.996 at 15° C. and vapourising said monomeric acroleinoxime as soon as possible after formation and passing the vapours over a dehydrating catalyst comprising alumina at a temperature of 200° to 400° C. whereby acrylonitrile is produced.

21. A process for the manufacture of acrylonitrile which comprises reacting acrolein with a solution of hydroxylamine in the substantial absence of free, strong, inorganic acids at a temperature not exceeding 50° C. and at a pH of 6.5 to 9, isolating from the reaction mixture monomeric acroleinoxime having the formula $CH_2=CH-CH=NOH$ and a boiling point of about 35° C. under a pressure of 9 mms. of mercury and a specific gravity of about 0.996 at 15° C. and adding said monomeric acroleinoxime to acetic anhydride maintained at a temperature below 50° C.

KARL HEINRICH WALTER TUERCK.
HANS JOACHIM LICHTENSTEIN.

REFERENCES CITED

The following references are of record in the file of this patent:

UNITED STATES PATENTS

| Number | Name | Date |
|---|---|---|
| 2,283,150 | Schlack | May 12, 1942 |
| 2,269,450 | Fitch | Jan. 13, 1942 |
| 2,257,908 | Hill et al. | Oct. 7, 1941 |
| 2,249,177 | Schlack | July 15, 1941 |
| 1,994,732 | Sebrell | Mar. 19, 1935 |
| 1,856,819 | North et al. | May 3, 1932 |
| 1,834,849 | Kropp | Dec. 1, 1931 |
| 2,183,357 | Richie et al. | Dec. 12, 1939 |
| 2,234,566 | Lazier et al. | Mar. 11, 1941 |
| 2,352,514 | Bruson et al. | June 27, 1944 |

OTHER REFERENCES

Votocek, Ber. Deut. Chem., vol. 50, pp. 37–39 (1917).

Bamberger et al., Ber. Deut. Chem., vol. 55, pp. 337–708 (1922).

Schindler, Monatsh. fur Chemie, vol. 12, pp. 410–413 (1891).

Schindler, Beilstein, vol. I (4th ed., 1918), p. 730.